UNITED STATES PATENT OFFICE.

GADIENT ENGI AND FRITZ GRIESHABER, OF BASEL, SWITZERLAND, ASSIGNORS TO SOCIETY OF CHEMICAL INDUSTRY IN BASLE, OF BASEL, SWITZERLAND.

LEUCO DERIVATIVES OF SULFURETED GALLOCYANINS AND PROCESS OF MAKING SAME.

1,188,259.      Specification of Letters Patent.      Patented June 20, 1916.

No Drawing.      Application filed March 3, 1915. Serial No. 11,852.

*To all whom it may concern:*

Be it known that we, Dr. GADIENT ENGI, a citizen of the Swiss Republic, and Dr. FRITZ GRIESHABER, a subject of the Grand Duke of Baden, both residents of Basel, Switzerland, have invented new and useful Leuco Derivatives of Sulfureted Gallocyanins and Process of Making Same, of which the following is a full, clear, and exact specification.

We have found that by treating with suitable reducing agents the sulfureted gallocyanins obtained by melting a gallocyanin with an alkali polysulfid, new stable leuco compounds are obtained which owing to their great solubility in dilute organic acids may be employed advantageously to dye chromium mordanted wool in an acid bath or with chromium acetate to print cotton.

The production of the leuco compound occurs for instance, by reducing the sulfureted gallocyanin with zinc in an acid solution and by precipitating from the filtered solution containing the leuco dyestuff this latter by addition of common salt or of crystallized sodium acetate, whereby the leuco compound is obtained in the form of yellow to clear yellow-brown little crystals.

The new stable leuco derivatives of the sulfureted gallocyanins derived from gallamic acid, constitute clear brown-yellow, stable powders, which dissolve in concentrated sulfuric acid with brown-yellow to brown-olive colorations turning by addition of lead peroxid to deep-blue, in hydrochloric acid with yellow to clear brown-yellow coloration, in alcohol with olive-yellow to green-blue coloration and give, when printed with chromium acetate on cotton and when dyed on chromium mordanted wool in acid bath, blue to greenish blue pure tints fast to light and to washing.

In cotton printing, the leuco derivate of the sulfureted gallocyanin is dissolved in formic acid and printed on fabrics with acid thickening, chromium acetate and a small quantity of hydrosulfite NF, and the fabrics are then steamed and finished as usual by rinsing and soaping. On chromium mordanted wool the new leuco compounds are dyed on the goods from an acid bath containing sodium sulfate, and the goods are afterward well rinsed and dried.

The preparation of the new leuco compounds is illustrated by the following example:

Example: 100 grams of the sulfureted gallocyanin derived from gallamic acid and nitrosodimethylanilin (obtained for instance by boiling for 8 to 10 hours a mixture of 20 parts of the gallocyanin derived from gallamic acid and nitrosodimethylanilin with 100 parts alcohol, 40 parts crystallized sodium sulfid and 20 parts sulfur in a vessel provided with a stirring apparatus and a reflux cooler) are introduced in the course of 20 minutes in 2.5 liters water, while the mass is stirred, the stirring of the mass is continued for some hours, hereafter 183 grams concentrated hydrochloric acid are added, in the course of about $\frac{1}{2}$ hour the mass is heated to 50° C. and in the course of a further hour 44 grams zinc powder are added gradually at 50–55° C. and the stirring is continued for $\frac{1}{2}$ hour at the same temperature. The clear yellow suspension obtained is filtered, the remaining residue is washed with hot water and to the liquid resulting from this filtration and washing are added, after cooling, 600 to 800 grams common salt, whereby the separation of the leuco compound in form of clear brown-yellow little fine crystals occurs immediately. These crystals are separated by filtration, washed first with a small quantity of an aqueous solution of common salt and afterward with a small quantity of water and finally dried at a moderate temperature preferably *in vacuo*. The stable powder of leuco dyestuff thus obtained is clear, brown yellow and dissolves in concentrated sulfuric acid with brown-yellow coloration turning in the air or more quickly on addition of lead peroxid, first to violet and afterward to deep-blue. In concentrated hydrochloric acid it dissolves with clear brown-yellow coloration, in alcohol with olive-yellow coloration and in nitrobenzene difficultly with feeble olive coloration. It dissolves easily and completely in organic acids (formic acid, lactic acid, etc.) even in a dilute state, is entirely free of mechanically admixed sulfur and is particularly fit to be printed on cotton with chromium mordants. The new leuco compound gives according to the processes above indicated blue pure prints and dyeings of very good fastness to washing and to light.

If in the foregoing example the sulfureted gallocyanin derived from nitrosodimethyl-anilin and gallamic acid is replaced by the sulfureted gallocyanin derived from nitrosodiethylanilin and gallamic acid, the resulting leuco compound formed constitutes a stable, clear brown-yellow powder dissolving in concentrated hydrochloric acid with a yellow coloration, in concentrated sulfuric acid with a brown-olive coloration turning on addition of lead peroxid first to green-blue and afterward to deep-blue, in cold alcohol with a yellow-green and in hot alcohol with a green coloration and in nitrobenzene with a green to green-blue coloration. The prints and dyeings obtained with this leuco compound are more greenish and purer than those obtained with the sulfureted gallocyanin of the foregoing example. Another sulfureted gallocyanin, for instance the sulfureted gallocyanin derived from nitrosodiethylphenetidin and gallamic acid, may be substituted for the sulfureted gallocyanin employed in the described example. In an analogous manner the reducing agents indicated in the above example may be replaced by other reducing agents for instance by alkaline reducing agents as for instance dilute soda lye and sodium hydrosulfite, etc.

What we claim is:

1. The described process for the manufacture of new stable leuco derivatives of the gallocyanin series consisting in treating sulfureted gallocyanins with reducing agents in an acid medium and separating the formed sulfureted leucogallocyanin from the reaction mass.

2. The described process for the manufacture of new stable leuco derivatives of the gallocyanin series consisting in treating sulfureted gallocyanins derived from gallamic acid with reducing agents in an acid medium and separating the formed sulfureted leucogallocyanin from the reaction mass.

3. The described new stable leuco derivatives of the sulfureted gallocyanins derived from gallamic acid, constituting clear brown-yellow, stable powders, dissolving in concentrated sulfuric acid with brown-yellow to brown-olive colorations turning by addition of lead peroxid to deep-blue, in concentrated hydrochloric acid with yellow to clear brown-yellow coloration, in alcohol with olive-yellow to green coloration and in nitrobenzene with feeble olive to green-blue coloration and giving, when printed with chromium acetate on cotton and when dyed on chromium mordanted wool in an acid bath, blue to greenish-blue pure tints fast to washing and to light.

4. As a new article of manufacture, the described new stable leuco derivative of the sulfureted gallocyanin derived from gallamic acid and nitrosodimethylanilin, constituting a clear brown-yellow stable powder, dissolving in concentrated sulfuric acid with a brown-yellow coloration turning by the action of air or by addition of lead peroxid first to violet and afterward to deep-blue, in concentrated hydrochloric acid with clear brown-yellow coloration, in alcohol with olive-yellow and in nitrobenzene with feeble olive coloration and giving, when printed on cotton with chromium acetate and when dyed on chromium mordanted wool in acid bath, deep blue tints fast to light and to washing.

In witness whereof we have hereunto signed our names this 12th day of February, 1915, in the presence of two subscribing witnesses.

Dr. GADIENT ENGI.
Dr. FRITZ GRIESHABER.

Witnesses:
ARNOLD ZUBER,
ARMAND RITTER.